United States Patent Office 3,322,834
Patented May 30, 1967

3,322,834
PROCESS FOR PRODUCTION OF DIARYL AND DI(ALKARYL) SULFIDES
Harold Wayne Hill, Jr., and James T. Edmonds, Jr., Bartlesville, Okla., assignors to Phillips Petroleum Company, a corporation of Delaware
No Drawing. Filed Nov. 27, 1963, Ser. No. 326,389
8 Claims. (Cl. 260—609)

This invention relates to the production of diaryl sulfides, di(alkaryl) sulfides and aryl alkaryl sulfides. In one of its aspects, the invention relates to the production of a diaryl or a di(alkaryl) sulfide by reacting an aryl halide or an alkaryl halide in a polar organic compound solvent at elevated temperature with an alkali metal sulfide. In another of its aspects, the invention relates to a reaction of an aryl halide and/or alkaryl halide with an alkali metal sulfide at an elevated temperature in a polar organic compound in a closed vessel under autogenous pressure. In a further aspect of the invention, it relates to the production of a diaryl and/or a di(alkaryl) sulfide using for this purpose an alkali metal sulfide or an alkali metal sulfide hydrate.

In a further aspect of the invention, the reaction of the alkali metal sulfide with the aryl halide or alkaryl halide is effected after removing at least a portion of water of hydration present in the alkali metal sulfide.

A wide variety of diaryl sulfides and di(alkaryl) sulfides are known, some of which have wide utility. However, the processes currently available for preparing these compounds are so tedious and expensive that the price of these compounds has remained relatively high, thus preventing real commercial development. For example, diphenyl sulfide has been prepared by the reaction of benzenediazonium chloride with the sodium mercaptide of thiophenol. Another method which has been used for the preparation of this compound is the pyrolysis of the lead mercaptide of thiophenol. Diaryl sulfides and di(alkaryl) sulfides are useful as intermediates for the preparation of insecticides, plasticizers, high boiling solvents and the like.

These sulfides are useful as high boiling solvents, heat exchange fluids, hydraulic fluids, and as intermediates for the production of sulfoxides and sulfones which, themselves, have utility in such fields as insecticides and high boiling solvents. For example, diphenyl sulfide has a melting point of −21.5° C. and a boiling point at atmospheric pressure of 296° C. This wide fluid range, coupled with its very high boiling point, makes this compound particularly suitable for use as a heat transfer media. Diphenyl sulfone, prepared by the peroxide oxidation of diphenyl sulfide is useful as an insecticide. Physical properties of other diaryl sulfides and di(alkaryl) sulfides are given in "Organic Chemistry of Bivalent Sulfur"—Reid, vol. 2, Chemical Publishing Company Incorporated, New York, (1960), pages 117–123. A relatively simple, economical process for the preparation of these sulfides would find ready acceptance by the industry.

It is an object of this invention to provide a new and improved process for the production of diaryl sulfides and/or di(alkaryl) sulfides. It is a further object of this invention to provide a new process for the production of said sulfides in a one-step reaction, employing inexpensive starting materials. It is a further object of the invention to prepare the said sulfides in the substantial absence of water. It is a still further object of the invention to provide a process for the production of the said sulfides avoiding tedious and expensive operations heretofore required.

Other aspects, objects and several advantages of the invention are apparent from a study of this disclosure and the appended claims.

According to the present invention, there is provided a process for the production of at least one diaryl sulfide, di(alkaryl) sulfide and/or aryl alkaryl sulfide by a reaction of an aryl monohalide and/or alkaryl monohalide with an alkali metal sulfide in a reaction media consisting essentially of a polar organic compound, said polar organic compound being a substantial solvent for the reactants and being essentially stable at the reaction conditions which generally include an elevated temperature, the range of temperature presently considered applicable being from about 125° C. to about 450° C.

The reaction according to which the invention can be said to be effected is illustrated by the equation $$2RX + M_2S \rightarrow R-S-R + 2MX$$

wherein each R is selected from the group consisting of aryl and alkaryl radicals containing fom 6 to 18 carbon atoms, inclusive, each X is a halogen selected from the group consisting of chlorine, bromine, fluorine and iodine, and M is an alkali metal selected from the group consisting of sodium, potassium, lithium, rubidium and cesium. At present, preferably, X is chlorine or bromine and M is sodium or potassium. Mixtures of reactants of any group can be used and are within the scope of the invention, e.g., the R and/or the X can be a mixture.

Some examples of compounds of the formula RX which can be employed as reactants in the process of this invention are:

chlorobenzene
4-chlorotoluene
bromobenzene
1-chloro-3-ethylbenzene
1-fluoro-3-isopropylbenzene
1-iodo-2-methyl-4-ethylbenzene
1-bromo-2,4-diethylbenzene
1-chloro-3,4,5,6-tetramethylbenzene
1-chloronaphthalene
4-chlorobiphenyl
2-bromobiphenyl
1-chloro-4-dodecylbenzene
1-bromo-2,4,6-tri-n-butylbenzene
4-bromo-p-terphenyl
6-n-octyl-1-chloronaphthalene and the like, including mixtures thereof.

The alkali metal sulfides which can be employed in the process of this invention are the monosulfides of sodium, potassium, lithium, rubidium and cesium, including the anhydrous and hydrated forms of the sulfides. The now preferred sulfide reactant is $Na_2S$ and its hydrates.

Polar organic compounds which can be employed as reaction media in the process of this invention are those in which the aryl halides, alkaryl halides and the alkali metal sulfides are at least partially soluble. Representative examples of suitable classes of compounds include amides, lactams, sulfones and the like. Specific examples of such compounds are N-methyl-2-pyrrolidone
pyrrolidone
caprolactam
N-ethylcaprolactam
sulfolane(tetrahydrothiophene-1,1-dioxide)
dimethylacetamide
tetramethylurea
hexamethylphosphoramide
N,N'-ethylenedipyrrolidone and the like.

The process of this invention is carried out by contacting the above defined reactants in at least one polar solvent at a temperature of from about 125° C. to about 450° C., preferably from 175° C. to 350° C. The mol ratios of RX reactant to $M_2S$ reactant should be at least 1.9:1, while the upper limit generally will not exceed 3:1. Larger amounts of RX reactants can be employed, if desired, and unreacted RX compound can be recovered and recycled to the reaction zone. The pressure in the reaction zone will generally be autogenous, although, at the reaction temperatures specified, this autogenous pressure can run as high as 1000 p.s.i. or greater, depending upon the chosen reactants and polar solvent. Reaction times will depend upon the chosen reaction temperature, and can range from 10 minutes to 50 hours. It is to be understood that, as in the case of most reactions, the longer reaction times will be required at the lower temperatures and vice versa.

The amount of polar organic solvent present in the reaction zone can vary over a wide range, but will generally range from about 100 to 2500 ml. per mol of $M_2S$ reactant.

It is preferred to employ the anhydrous form of the alkali metal sulfides. The sulfides can be charged to the reaction zone in this form or the sulfides can be charged to the reaction zone in a hydrated form, utilizing a drying procedure to remove the water of hydration prior to charging the RX reactant. For example, a hydrated form of an alkali metal sulfide can be heated while bubbling nitrogen through the solution in polar organic solvent to remove water. This water removal can be effected in the reaction zone prior to charging the RX reactant, or the water removal can be carried out in a separate zone, thereafter charging a solution of the anhydrous sulfide in polar organic solvent to the reaction zone.

The reaction can be carried out batch-wise or as a continuous operation. At the completion of the reaction, conventional techniques can be utilized for recovering the diaryl sulfides, di(alkaryl) sulfides, aryl alkaryl sulfides and/or mixtures thereof. At the completion of the reaction, the reaction mixture is generally cooled from the reaction temperature, filtered to remove alkali metal halide and then treated by such processes as distillation, crystallization, extraction and the like for recovery of the sulfide product.

It can be seen from the above discussion and the following examples that the process of the invention provides a relatively simple, economic process for the production of diaryl sulfides, di(alkaryl) sulfides, aryl alkaryl sulfides and/or mixtures thereof. Typical sulfides which can be prepared by this process include:

diphenyl sulfide
di(4-methylphenyl) sulfide
di(3-ethylphenyl) sulfide
di(2-methyl-4-isopropylphenyl) sulfide
di(2,4-diethylphenyl) sulfide
dinaphthyl sulfide
phenyl 4-methylphenyl sulfide
di(2-ethyl-4-n-decylphenyl) sulfide
phenyl naphthyl sulfide
di(4-biphenylyl) sulfide
di(4-[p,p'-terphenylyl]) sulfide
4-biphenylyl phenyl sulfide

*Example I*

Sodium sulfide was reacted with chlorobenzene according to the process of the invention to produce diphenyl sulfide.

240.2 grams of $Na_2S \cdot 9H_2O$ were heated in 1 liter of N-methylpyrrolidone to 190° C. while flushing with nitrogen. This preliminary treatment was to remove essentially all of the water of hydration. The resulting solution was charged to a stainless steel bomb, and, after cooling, 255.1 grams of chlorobenzene were charged to the bomb.

The mixture was then heated to 250° C. and maintained at this temperature for 17 hours. The bomb was then cooled and then opened and a light green colored liquid with undissolved sodium chloride was recovered. Analysis by gas-liquid chromatography indicated a yield of about 74 weight percent diphenyl sulfide and about 26 percent unreacted chlorobenzene. After filtering out the salt, the mixture was distilled, and the diphenyl sulfide was collected at 162° C. at 15 mm. mercury absolute pressure. A total of 116.6 grams of diphenyl sulfide was recovered. Gas-liquid chromatography indicated a purity of 97 percent for this material. Infrared analysis confirmed the product as diphenyl sulfide. Elemental analysis of this material gave the following results:

ELEMENTAL ANALYSIS

| | Calculated | Found |
|---|---|---|
| Element, wt. percent: | | |
| Carbon | 77.5 | 76.9 |
| Hydrogen | 5.4 | 5.5 |
| Sulfur | 17.1 | 15.1 |

*Example II*

A series of runs was carried out in which either chlorobenzene or bromobenzene was reacted with sodium sulfide in a polar solvent according to the process of this invention.

(1) 13.0 grams of sodium sulfide (60 percent), 31.5 grams of bromobenzene and 150 ml. of N-methylpyrrolidone were charged to a 500 ml. flask fitted with a thermometer in the vapor region and a condenser with a fitting for use under a nitrogen atmosphere. This charge comprised 0.2 mol of bromobenzene and 0.1 mol of $Na_2S$. The resulting solution was heated under reflux for about 38 hours. The mixture was allowed to stand to cool, after which it was diluted with 800 ml. of water, and the aqueous phase was extracted with two 200 ml. portions of ether.

The ether layers were combined and dried and ether was then distilled off. The remaining material was then distilled through a Vigreaux column, and a cut boiling at 120 to 121° C. at 5 mm. mercury absolute pressure was collected. This cut, amounting to 5.6 grams, had a refractive index $n_D^{25}$ of 1.6295. This represents a 30 percent yield of diphenyl sulfide.

The sample of diphenyl sulfide was dissolved in 75 ml. of acetic acid and treated with 10 ml. of 30 percent hydrogen peroxide. The peroxide-sulfide mixture was heated on a steam bath for 1 hour and then poured into ice. The resulting white precipitate was filtered out, washed with water and dried. After recrystallization from ethanol, a material melting at 124 to 126° C. was recovered, as compared with the reported melting point of 125° C. for diphenyl sulfone.

(2) To show the effect of drying the alkali metal hydrate prior to the reaction, the same charge was employed as in (1) except that the sulfide and solvent were charged to the flask and heated to 195° C. to remove water prior to charging the bromobenzene. Approximately 125 ml. of N-methylpyrrolidone boiled off with the water, so an equivalent amount of this material was recharged. The mixture was cooled to 100° C. and the bromobenzene was added. The resulting mixture was refluxed (approximately 180° C.) for about 24 hours, after which the material was allowed to cool over a week-end and worked up as in (1). A yield of 7.9 grams of material boiling at 110 to 123° C. at 5 mm. mercury absolute pressure, $n_D^{25}$ of 1.6275, was obtained. This represents a yield of 42.5 percent, and clearly shows that drying of the sodium sulfide hydrate improves the yield.

In Run 3, the procedure of (2) was employed, except that 150 ml. of 2-pyrrolidone was used. After refluxing for 27 hours at 185° C., the reaction mixture was worked up as in the preceding runs. 2.4 grams of material boiling at 111° C. at 5 mm. mercury and having a refractive index of $n_D^{25}$ of 1.6560, were recovered. This represents a yield of 13 percent of diphenyl sulfide and, again, illustrates the advantage of preliminary drying of the sulfide hydrate before adding the halobenzene.

Still another Run 4 was carried out in which the preliminary drying step was used. This run was carried out by the method of (2) except that chlorobenzene, 22.5 grams (0.2 mol), was used. Furthermore, 100 ml. of benzene were added to the charge to aid in the removal of water during the drying step. After refluxing for 50 hours at a liquid temperature of 185 to 193° C., the reaction mixture was worked up as in the preceding runs. A yield of 2.8 grams of material boiling at 110 to 115° C. at 5 mm. mercury absolute, $n_D^{25}$ of 1.6200, was obtained. This represents a yield of 15 percent.

In Run 5, 150 ml. of N-methylpyrrolidone, 100 ml. of benzene and 13 grams (0.1 mol) of the sodium sulfide of the previous runs were distilled until the vapor temperature reached 200° C., after which the mixture was cooled and charged to a 300 ml. autoclave equipped with a magnetic stirrer. To this mixture was then added 31.4 grams (0.2 mol) of bromobenzene. After 4 hours at 235° C., the mixture was cooled and diluted with 1000 ml. of water. The aqueous phase was extracted 3 times with ether, using a total of 400 ml. ether, and the combined extracts were washed with water and dried. The ether was flashed off, and the residue was distilled, yielding 12.3 grams of material boiling at 105–110° C. at 4.5 mm. mercury absolute. This material had a refractive index $n_D^{25}$ of 1.6292, and represents a 66 percent yield of diphenyl sulfide.

Another Run 6 was carried out in the autoclave as Run 5 except that 0.2 mol of chlorobenzene was used and reaction conditions of 210° C. for 90 minutes and 220–224° C. for 3.5 hours were used. A yield of 11 percent if diphenyl sulfide was obtained. In this run, some of the heavier material was examined by infrared analysis and found to contain diphenyl disulfide.

In Run 7, Run 5 was repeated using 0.2 mol bromobenzene and, however, using a reaction time of 5 hours at 230–250° C. A yield of 60 percent of diphenyl sulfide was obtained.

The above runs are summarized below in the form of a table.

| Run No. | Halobenzene Used | Features | Yield, Mol percent |
|---|---|---|---|
| 1 | Bromobenzene | No drying | 30 |
| 2 | do | Preliminary drying | 42.5 |
| 3 | do | Pyrrolidone solvent, drying | 13 |
| 4 | Chlorobenzene | Benzene in drying step | 15 |
| 5 | Bromobenzene | 235° C. for 4 hours | 66 |
| 6 | Chlorobenzene | 210–225° C. for 5 hours | 11 |
| 7 | Bromobenzene | 230–250° C. for 5 hours | 60 |

*Example III*

39 grams (0.5 mol) of anhydrous $Na_2S$, 113 grams (1.0 mol) of chlorobenzene, and 500 ml. of dimethylacetamide were heated together at 300° C. for 3.5 hours. The reaction mixture was then diluted to 1500 ml. with water, after which the mixture was extracted 3 times with ether. The ether extracts were combined, washed twice with water, dried and distilled under vacuum to isolate diphenyl sulfide. The yield, boiling 117° C. to 119° C. at 3 mm. Hg absolute pressure was 34 grams, representing a yield of 36.6 percent of theoretical.

This run was then repeated except that 500 ml. of tetramethylurea was used as the polar organic solvent, and the mixture was heated at 232° C. for 27 hours. The washing, extraction and general work up procedure was the same as above, and the yield of diphenyl sulfide, boiling 115° C. to 117° C. at 3 mm. Hg absolute pressure was 15 grams equivalent to 16 percent of theoretical.

Still another run was carried out by the same procedure except that 500 ml. of hexamethylphosphoramide was employed, and the mixture was heated at 300° C. for 3 hours. Analysis of the reaction product by gas-liquid chromatography indicated that the reaction product contained 68 weight percent diphenyl sulfide. This analysis was after removal of the reaction solvent.

The above three runs show polar organic solvents other than N-methylpyrrolidone can be employed in the process of this invention.

*Example IV*

A mixture of 1 liter of N-methylpyrrolidone (NMP) and 240.2 grams of sodium sulfide nonahydrate was heated to distill water overhead. After 211 grams of water and NMP had been distilled overhead, the remaining material was poured into a bomb and allowed to cool to about 25° C. At this time, 253.2 grams of p-chlorotoluene were charged to the bomb, and the contents were heated to 293° C. and maintained at this temperature for 1.5 hours while shaking on a rocker. The reactor was then cooled and 2 liters of water and 1 liter of benzene were added to the reaction mixture. The hydrocarbon layer was separated, washed with water, and distilled to a pot temperature of 250° C. Needles of di(p-tolyl) sulfide crystallized in the kettle of the distillation column. Some product was lost in mechanical handling, but 72.1 grams of di(p-tolyl) sulfide were recovered.

Reasonable variation and modification are possible in the scope of the foregoing disclosure and the appended claims to the invention the essence of which is that diaryl, di(alkaryl) and aryl alkaryl sulfides have been prepared by a reaction between an aryl or alkaryl monohalide and sodium sulfide in a polar organic solvent at an elevated temperature.

We claim:

1. A process for the preparation of at least one of diaryl sulfide, di(alkaryl) sulfide and aryl alkaryl sulfide which comprises reacting at an elevated temperature at least one of aryl monohalide and alkaryl monohalide with an alkali metal monosulfide in a polar organic compound solvent reaction medium selected from amides and lactams which are solvents for the reactants and then recovering a sulfide thus formed from the reaction mass thus obtained.

2. A process according to claim 1 wherein the halide reactant is one of the following:

chlorobenzene
4-chlorotoluene
bromobenzene
1-chloro-3-ethylbenzene
1-fluoro-3-isopropylbenzene
1-iodo-2-methyl-4-ethylbenzene
1-bromo-2,4-diethylbenzene
1-chloro-3,4,5,6-tetramethylbenzene
1-chloronaphthalene
4-chlorobiphenyl
2-bromobiphenyl
1-chloro-4-dodecylbenzene
1-bromo-2,4,6-tri-n-butylbenzene
4-bromo-p-terphenyl
6-n-octyl-1-chloronaphthalene.

3. A process for the preparation of at least one of diaryl sulfide, di(alkaryl) sulfide, and aryl alkaryl sulfide which comprises reacting at an elevated temperature at least one of aryl monohalide and alkaryl monohalide with an alkali metal monosulfide in a reaction medium which is a polar organic compound solvent which is a solvent for the reactants selected from amides and lactams, the reaction taking place being as follows:

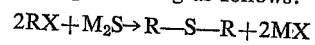

wherein each R is a member selected from the group consisting of aryl and alkaryl radicals containing from 6 to 18 carbon atoms, inclusive, X is a halogen selected from the group consisting of chlorine, bromine, fluorine and iodine, and M is an alkali metal selected from the group consisting of sodium, potassium, lithium, rubidium and cesium.

4. A process for the preparation of at least one of diaryl sulfide, di(alkaryl) sulfide and aryl alkaryl sulfide which comprises reacting at an elevated temperature at least one of aryl monohalide and alkaryl monohalide with an alkali metal monosulfide in a reaction medium which is a polar organic compound solvent selected from amides and lactams which is a solvent for the reactants wherein prior to the reaction the mass to be reacted is freed from water.

5. A process for the preparation of at least one of diaryl sulfide, di(alkaryl) sulfide and aryl alkaryl sulfide which comprises reacting at an elevated temperature at least one of aryl monohalide and alkaryl monohalide with an alkali metal monosulfide in a reaction medium which is a polar organic compound solvent selected from amides and lactams which is a solvent for the reactants, the alkali metal sulfide being dehydrated and freed from any water of crystallization prior to effecting said reaction.

6. A process for the production of at least one of diaryl sulfide, di(alkaryl) sulfide and aryl alkaryl sulfide which comprises reaction of at least one of aryl monohalide and alkaryl monohalide with an alkali metal monosulfide in a polar organic compound solvent reaction medium selected from amides and lactams which is a solvent for the reactants at a temperature in the range of from about 125–450° C.

7. A process for the preparation of at least one of diaryl sulfide, di(alkaryl) sulfide and aryl alkaryl sulfide which comprises reacting at least one of aryl monohalide and alkaryl monohalide with an alkali metal monosulfide in a polar organic compound solvent reaction medium which is a solvent for the reactants at elevated temperature in the approximate range 125° C.–450° C., and then recovering a sulfide thus formed from the reaction mass thus obtained, said polar organic reaction medium being selected from the group consisting of amides and lactams and the ratio of the halide reactant to the alkali metal sulfide being at least 1.9:1.

8. A process according to claim 7 wherein the reaction medium is selected from the group consisting of:

N-methyl-2-pyrrolidone
pyrrolidone
caprolactam
N-ethylcaprolactam
sulfolane
dimethylacetamide
tetramethylurea
hexamethylphosphoramide and
N,N'-ethylenedipyrrolidone.

References Cited

UNITED STATES PATENTS 2,107,366  2/1938  Bruson _____ 260—609 X
2,185,009  12/1939  Babcock et al. ____ 260—609 X CHARLES B. PARKER, *Primary Examiner.*

JOSEPH P. BRUST, *Examiner.*

DELBERT R. PHILLIPS, *Assistant Examiner.*